United States Patent
Gupta

(10) Patent No.: US 9,542,930 B2
(45) Date of Patent: Jan. 10, 2017

(54) SYSTEM AND METHOD FOR ENHANCING LOCATIVE RESPONSE ABILITIES OF AUTONOMOUS AND SEMI-AUTONOMOUS AGENTS

(71) Applicant: Knexus Research Corporation, Oxen Hill, MD (US)

(72) Inventor: Kalyan M. Gupta, Springfield, VA (US)

(73) Assignee: Knexus Research Corporation, Oxon Hill, MD (US)

( * ) Notice: Subject to any disclaimer, the term of this patent is extended or adjusted under 35 U.S.C. 154(b) by 0 days.

(21) Appl. No.: 14/931,199

(22) Filed: Nov. 3, 2015

(65) Prior Publication Data

US 2016/0055843 A1 Feb. 25, 2016

Related U.S. Application Data

(63) Continuation of application No. 13/480,606, filed on May 25, 2012.

(Continued)

(51) Int. Cl.
  *G09G 5/00* (2006.01)
  *G10L 13/027* (2013.01)
  (Continued)

(52) U.S. Cl.
  CPC .............. *G10L 13/027* (2013.01); *G06F 3/017* (2013.01); *G06F 3/041* (2013.01);
  (Continued)

(58) Field of Classification Search
  CPC ...... G06F 3/017; G06F 3/041; G06F 3/04815; G06F 3/16; G06T 19/003; G10L 13/027; G10L 13/043; G10L 25/54
  See application file for complete search history.

(56) References Cited

U.S. PATENT DOCUMENTS 5,864,808 A   1/1999  Ando et al.
6,973,459 B1  12/2005  Yarmus
(Continued)

OTHER PUBLICATIONS

U.S. Patent and Trademark Office, International Searching Authority, PCT/US2012/39792, International Search Report and Written Opinion, Jul. 27, 2012.

(Continued)

*Primary Examiner* — Kumar Patel
*Assistant Examiner* — Insa Sadio
(74) *Attorney, Agent, or Firm* — Williams Mullen PC; Thomas F. Bergert

(57) ABSTRACT

A computer system and method according to the present invention can receive multi-modal inputs such as natural language, gesture, text, sketch and other inputs in order to simplify and improve locative question answering in virtual worlds, among other tasks. The components of an agent as provided in accordance with one embodiment of the present invention can include one or more sensors, actuators, and cognition elements, such as interpreters, executive function elements, working memory, long term memory and reasoners for responses to locative queries, for example. Further, the present invention provides, in part, a locative question answering algorithm, along with the command structure, vocabulary, and the dialog that an agent is designed to support in accordance with various embodiments of the present invention.

7 Claims, 4 Drawing Sheets

Related U.S. Application Data

(60) Provisional application No. 61/493,542, filed on Jun. 6, 2011.

(51) Int. Cl.

| | | |
|---|---|---|
| *G06F 3/0481* | (2013.01) | |
| *G06F 3/01* | (2006.01) | |
| *G06F 3/041* | (2006.01) | |
| *G06F 3/16* | (2006.01) | |
| *G06T 19/00* | (2011.01) | |
| *G10L 13/04* | (2013.01) | |
| *G10L 25/54* | (2013.01) | |

(52) U.S. Cl.
CPC ............ *G06F 3/04815* (2013.01); *G06F 3/16* (2013.01); *G06T 19/003* (2013.01); *G10L 13/043* (2013.01); *G10L 25/54* (2013.01)

(56) References Cited

U.S. PATENT DOCUMENTS

| | | | |
|---|---|---|---|
| 7,324,104 B1 | | 1/2008 | Bitter et al. |
| 2005/0068581 A1* | | 3/2005 | Hull ...................... G06F 3/1206 358/1.16 |
| 2006/0190097 A1 | | 8/2006 | Rubenstein |
| 2008/0318547 A1 | | 12/2008 | Ballou et al. |
| 2010/0211880 A1 | | 8/2010 | Haggar |
| 2008/0328344 | | 12/2010 | Mattila et al. |
| 2010/0328344 A1* | | 12/2010 | Mattila ................. G06F 1/1626 345/633 |
| 2011/0122004 A1 | | 5/2011 | Rekaya-Ben Othman et al. |

OTHER PUBLICATIONS

Kelleher, John and Costello, Fintan, Applying Computational Models of Spatial Prepositions to Visually Situated Dialog, Computation Linguistics, vol. 35, No. 2. pp. 271-306, 2009.

U.S. Patent and Trademark Office Action for U.S. Appl. No. 13/480,606 dated Aug. 31, 2015.

U.S. Patent and Trademark Office Action for U.S. Appl. No. 13/480,606 dated Apr. 10, 2015.

U.S. Patent and Trademark Office Action for U.S. Appl. No. 13/480,606 dated Aug. 15, 2014.

International Preliminary Report on Patentabilty for PCT/US2012/39792, USPTO, Jun. 28, 2013.

Response to ISR/WO Accompanying Article 34 Amendments, Argument and Demand for International Preliminary Examination, Thomas F. Bergert, Jan. 24, 2013.

\* cited by examiner

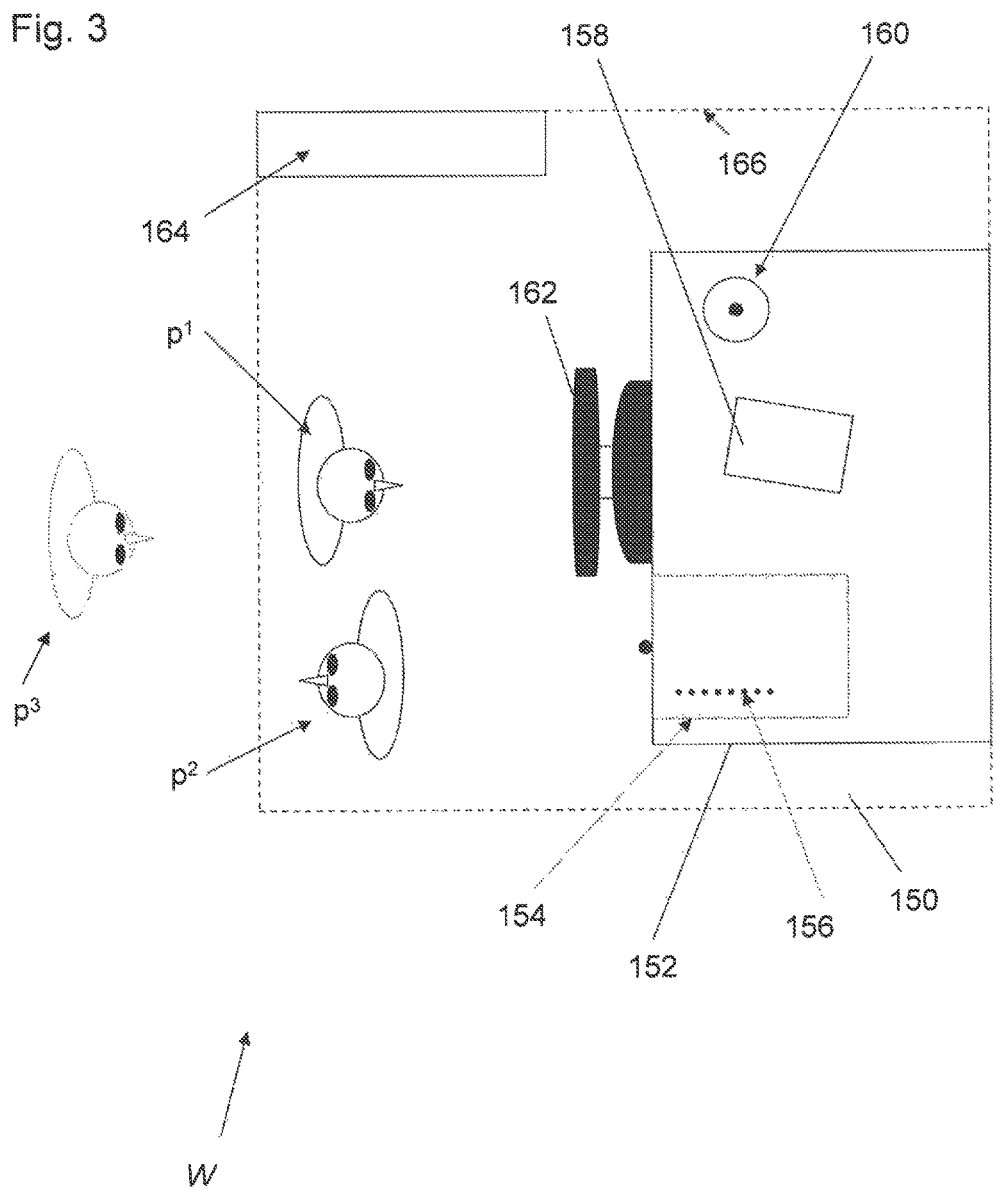

| $p^1$ | $p^2$ | $p^3$ |
|---|---|---|
| You Cost=0.00 | You Cost=0.00 | You Cost=0.00 |
| Table Cost=183.97 | Table Cost=306.61 | Office Cost=5717.65 |
|   Drawer Cost=1842.85 |   Drawer Cost=1965.49 |   Table Cost=5837.65 |
|     Bottle Cost=∞ |     Bottle Cost=∞ |     Drawer Cost=7828.30 |
|       Book Cost=∞ |       Book Cost=∞ |       Book Cost=∞ |
|     Book Cost=∞ |     Book Cost=∞ |     Bottle Cost=11436.37 |
|   Bottle Cost=4849.57 |   Bottle Cost=4972.21 |       Book Cost=11456.52 |
|     Book Cost=∞ |     Book Cost=∞ |     Chair Cost=5912.30 |
|   Chair Cost=246.18 |   Chair Cost=368.82 |       Book Cost=9313.95 |
|     Drawer Cost=349.86 |     Drawer Cost=472.50 |     Book Cost=8325.97 |
|       Book Cost=∞ |       Book Cost=∞ |     Drawer Cost=12353.17 |
|     Bottle Cost=6575.51 |     Bottle Cost=6698.16 |       Bottle Cost=∞ |
|       Book Cost=∞ |       Book Cost=∞ |       Book Cost=∞ |
|     Book Cost=3080.89 |     Book Cost=3203.53 |       Book Cost=∞ |
| Book Cost=2257.57 | Book Cost=2380.21 |     Bottle Cost=238997.65 |
| Drawer Cost=564.05 | Drawer Cost=940.08 |       Book Cost=239014.45 |
|   Bottle Cost=∞ |   Bottle Cost=∞ |   Chair Cost=6754.45 |
|     Book Cost=∞ |     Book Cost=∞ |     Drawer Cost=6858.13 |
|   Book Cost=∞ |   Book Cost=∞ |       Book Cost=∞ |
| Bottle Cost=22316.77 | Bottle Cost=22316.77 |     Bottle Cost=13083.78 |
|   Book Cost=∞ |   Book Cost=∞ |       Book Cost=13103.94 |
| Chair Cost=22.52 | Chair Cost=41.29 |     Book Cost=9589.16 |
|   Drawer Cost=108.92 |   Drawer Cost=127.69 |   Book Cost=∞ |
|     Bottle Cost=∞ |     Bottle Cost=∞ | Table Cost=∞ |
|       Book Cost=∞ |       Book Cost=∞ | .... |
|     Book Cost=∞ |     Book Cost=∞ |   Bottle Cost=∞ |
|   Bottle Cost=5296.97 |   Bottle Cost=5315.74 |     Book Cost=∞ |
|     Book Cost=∞ |     Book Cost=∞ |   Book Cost=∞ |
|   Book Cost=2384.78 |   Book Cost=2403.55 | Book Cost=∞ |
| Book Cost=12047.52 | Book Cost=24541.24 | |

SYSTEM AND METHOD FOR ENHANCING LOCATIVE RESPONSE ABILITIES OF AUTONOMOUS AND SEMI-AUTONOMOUS AGENTS

REFERENCE TO RELATED APPLICATIONS

This application claims the benefit of U.S. patent application No. 61/493,542, entitled "System and Method for Enhancing Locative Response Abilities of Autonomous and Semi-Autonomous Agents" filed Jun. 6, 2011.

BACKGROUND AND SUMMARY OF THE INVENTION

Semi-autonomous agents or bots can perform various actions in the physical and virtual worlds. For example, in the physical world, robots assemble cars and clean swimming pools, and unmanned arial vehicles (UAVs) perform complex missions such as urban surveillance and fuel resupply missions. Likewise, in the virtual world, such as first person shooter games, or real-time strategy games, and military training simulators, for example, bots may perform some actions based on scripted rules and low level user inputs.

The state-of-the-art autonomous agents in physical and virtual worlds have limited conversational abilities. Moreover, none are capable of answering locative queries, i.e., "where is . . . " questions. Further, an agent's autonomy, i.e., its ability to operate with little or no human supervision or operation, is very limited. For example, UAVs require six operators to fly a mission and the virtual bots require complex and unnatural controller inputs. Additionally, natural language communication with bots is limited to simple commands. For example, a driver can turn on the radio in a car using voice commands, but cannot ask any questions and receive answers. These challenges inherently and substantially limit the practical uses for autonomous agents.

In one aspect, the present invention provides physical and virtual bots with a vastly superior level of autonomy than the current state-of-the-art. Specifically, virtual bots ("communicative bots") in accordance with the present invention are capable of acting based on natural language commands, having a task-based conversation, and answering locative questions. The practical applications of such bots are endless.

With regard to locative question answering, one can imagine a common household scenario, where a farsighted elderly person asks his/her spouse "Where are my reading glasses?", to which the spouse responds, "They are directly behind you on the dresser". There are two main components of such a response. First, the landmarks such as you and the dresser, and second, the terms such as behind and on that describe the spatial relations of the target object, that is, reading glasses, with the landmarks and possibly between the landmark objects.

To create a response to such locative questions, an agent must decide which and how many landmarks to use and what spatial relations go with them. Past efforts describing landmark selection in the spatial reasoning field outline a set of selection criteria for landmarks, such as, it is bigger and more complex in shape than the target object, immediately perceivable, and less mobile. Past efforts also describe an influence model for landmark selection, which include search space optimization, listener location, and brevity of communication. However, these efforts fall short of operationalizing their approach and do not present a model that provides a clear description of how many landmarks to select. In contrast, the present invention provides a computational model for landmark selection and location description generation which minimizes the listener's mental cost in locating the target object.

One of the key insights employed by the present invention is that, in asking the locative question, the requester is trying to reach or find the target object, and the best response description is the one that minimizes the amount of search or looking around that the listener must do to locate the target object.

For example, imagine a force protection unit asking a scout bot, "where are the insurgents?" The scout bot in accordance with the present invention can respond, for example, "on the roof top of the building two blocks ahead of you." As another example, a worried parent of a lost child in a museum who was previously tagged with a location sensor may ask a locator bot in accordance with the present invention, "where is Johnny'?" using her cell phone. The locator bot in accordance with the present invention can respond, for example "in front of the drinking fountain next to the dinosaur exhibit to your right." As another example, in a multiplayer video game such as Call of Duty Black Ops™ (Call Of Duty™, 2011) a player could ask his virtual team mate "where are you" and it would provide a suitable answer.

The same approach can be used to help shoppers locate products in a retail store and the retailer can cross-sell and up-sell products to the shopper based on the questions they ask. No currently available system or methods provide such abilities. While there are many commercial systems for outdoor wide area navigation, there is little in the way of indoor navigation support such as shopping malls, large ships, and public parks.

The present invention thus provides a computational approach for representing and reasoning about the locations of objects in the world to construct a response to locative queries. The present invention can be implemented in an embodied software bot (a bot that can sense the world around it, reason about what it senses, and act) that answers locative (e.g., "Where is . . . ?") questions.

The present invention further provides, in part, an approach for implementing a Communicative Agent for Spatio-Temporal Reasoning (called CoASTeR™, in one embodiment) that responds to multi-modal inputs (speech, gesture, and sketch) to dramatically simplify and improve locative question answering in virtual worlds, among other tasks. In one aspect, the present invention provides a software system architecture workbench that includes CoASTeR. The components of an agent as provided in accordance with one embodiment of the present invention can include one or more sensors, actuators, and cognition elements, such as interpreters, executive function elements, working memory, long term memory and reasoners for responses to locative queries. Further, the present invention provides, in part, a locative question answering algorithm, along with the command structure, vocabulary, and the dialog that an agent is designed to support in accordance with various embodiments of the present invention.

BRIEF DESCRIPTION OF THE DRAWINGS

FIG. 3 shows an example flow diagram in accordance with one embodiment of the present invention.

FIG. 4 shows an example rendering of objects in connection with a method for locative questioning in accordance with one embodiment of the present invention.

DETAILED DESCRIPTION OF EMBODIMENTS OF THE PRESENT INVENTION

Figure 1:
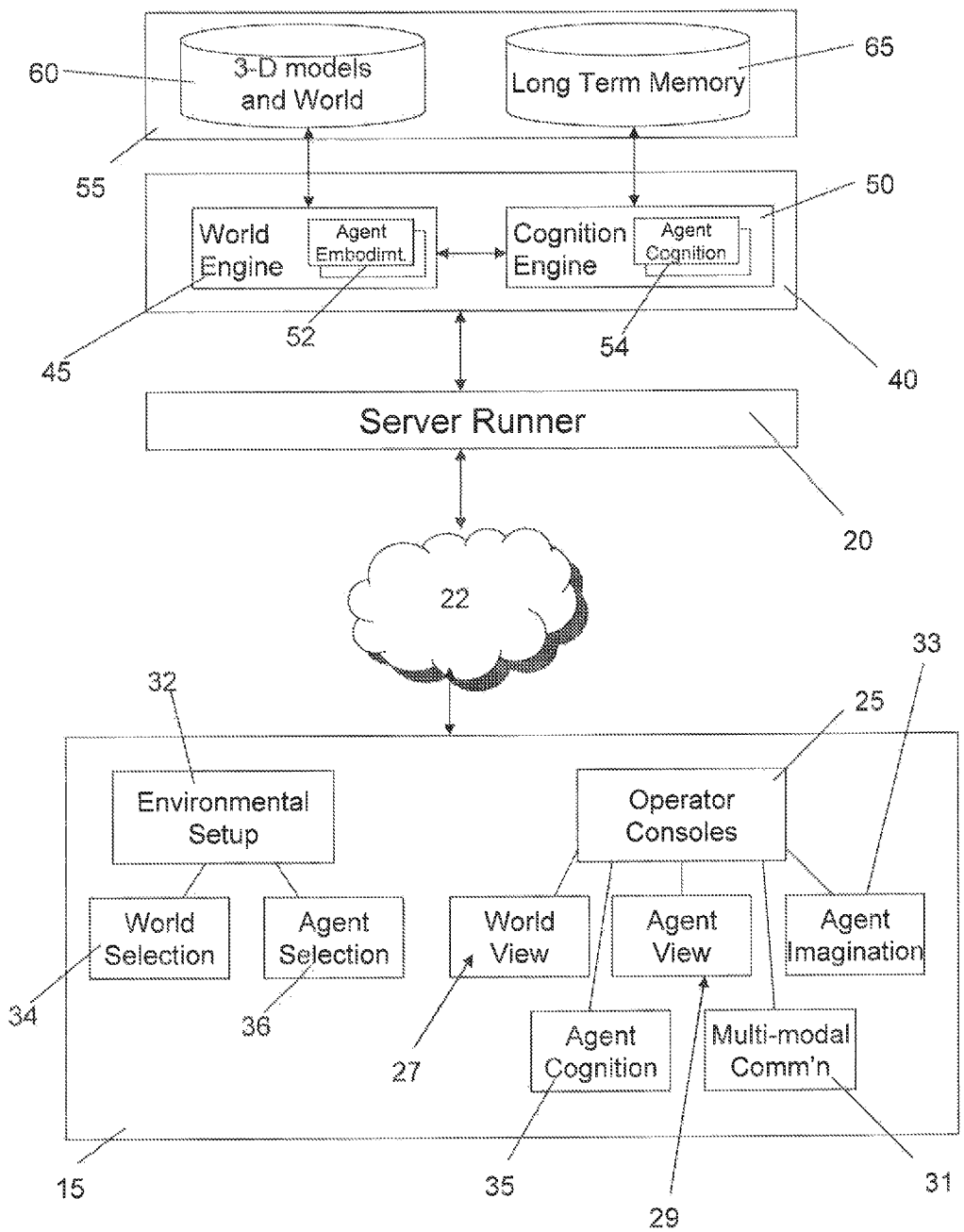
FIG. 1 shows one embodiment of a system architecture employed by the present invention.

As shown in FIG. 1, the system 10 of the present invention can be implemented in a modular client server architecture, with different sets of plug-and-play components, including one or more operator clients 15, access server runner 20, engine 40 and knowledge bases 55. The system of the present invention is a computer-based system, where the components can be implemented in hardware, software, firmware, or combinations thereof. It will be appreciated that the system of the present invention incorporates necessary processing power and memory for storing data and programming that can be employed by one or more processors to carry out the functions and communications necessary to facilitate the processes and functionalities described herein. In one embodiment, the components, sub-components and/or modules associated with the present invention can be implemented using object oriented languages such as C++ or Java using well defined software interfaces such that the implementation of any component can replaced by another with equivalent functionality without affecting the overall functionality of the workbench. It will be appreciated that access can be provided over a public or private network 22, including the Internet, in various embodiments of the present invention. The present invention can comprise, in one embodiment, computer program instructions for receiving one or more inputs, determining a valid and/or optimal location for a virtual object in a virtual world and placing the object in the virtual world according to the determination. The computer program instructions can also perform the other processes and algorithm elements described hereinafter. The computer program instructions can be embodied in a computer readable medium, which can be any data storage device capable of storing data which can thereafter be read by a computer or computer system. Example such devices are hard drives, network storage, read-only memory (ROM), random access memory (RAM), compact discs, magnetic tapes, portable storage devices such as flash drives, and other optical and non-optical data storage devices. The computer readable medium can also be distributed over a network-connected computer system to allow the computer program instructions to be stored and executed in a distributed manner. Computers and/or computer systems capable of employing the present invention include mobile communication devices and other microprocessor-based devices, as well as minicomputers, mainframe computers and networked computers, for example.

With reference to FIG. 1, the operator client 15 comprises the user interface layer of the architecture of the system 10 of the present invention, and includes interaction consoles 25 such as World View console 27 and Agent View console 29. The World View 27 console permits the user to interact with the virtual environment selected by the user, and the Agent View console 29 permits the user to interact with one or more agents that will then be employed in the virtual environment. The consoles 25 can further include input/output (I/O) devices shown generally at 31 to promote multi-modal communication, including devices such as a graphical user interface (GUI) with a text input chat, a headset with microphone to provide speech input, a sketch device such as an iPad™ gesture input device such as Microsoft Kinect™ or Nintendo Wii™, and a display screen such as those provided by a computer, television or other display unit. It will be appreciated that all I/O devices may not be included in particular implementations of the present invention. The consoles 25 can further include agent imagination console 33 and agent cognition console 35. These consoles 33, 35 can permit a user to view the traces of reasoning algorithm operation so as to, for example, identify potential reasoning errors. These consoles can further be used to identify the root causes of unexpected behavior, and apply adjustments to correct such behavior.

The Server Runner 20 enables the workbench of the present invention to operate in a client server mode, where multiple operator clients 15 can either locally or remotely connect to the engine 40 of the present invention. The engine 40 is the core of the system 10 of the present invention and, as shown in the embodiment of the invention represented by FIG. 1, comprises a World Engine 45 and a Cognition Engine 50. The World Engine 45 is adapted to interact with third party components (not shown) such as, for example, a game engine application programming interface (API) or a 3-D graphics engine API (e.g., Object-Oriented Graphics Rendering Engine ("OGRE")). An agent's physical representation or its embodiment 52 resides in the World Engine 45. Through its embodiment API, the agent can perceive or sense the virtual world in which it interacts, gather information about the objects, including their position and movements, for example, and create events or actions that change the world. The communicative abilities and programming of the present invention can be embedded in any existing 3-D graphical software application that provides a suitable API to access and manipulate the contents of the virtual world. For example, the present invention can interact with OGRE, a 3-D graphical rendering engine. The Cognition Engine 50 houses an agent's reasoning and/or its cognitive ability 54, as described in more detail below.

The Knowledge Base layer 55 includes a variety of data and knowledge that can be employed in the system of the present invention. For example, programmed models for spatial reasoning, gesture models, parameters for the landmark selection and/or locative response algorithm in the Long Term Memory of the present invention, and programmed graphical object models to retrieve and place in the virtual world can be stored in the Models and World Knowledge Base 60. Long Term Memory knowledge base 65 can store dictionaries, grammar rules, semantics and knowledge bases (such as outlined below), for example.

The Environmental setup component 32 of operator client 15 can include a world selection sub-component 34 and an agent selection sub-component 36 for permitting the user to select a virtual world and an agent to act within the selected virtual world.

Figure 2:
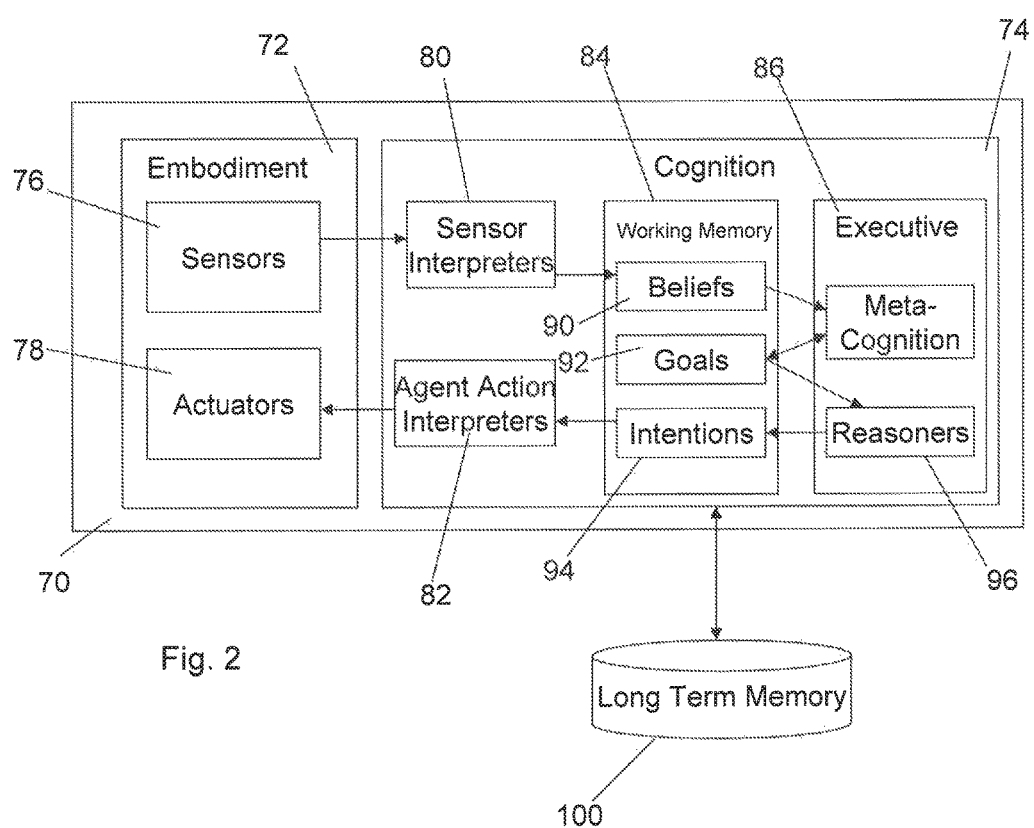
FIG. 2 shows one embodiment of an agent architecture employed by the present invention.

FIG. 2 shows one embodiment of the cognitive architecture 70 for an agent in accordance with the present invention. The architecture in FIG. 2 includes the Embodiment or physical representation component 72 and the Cognition component 74, which are referred to above in connection with the World Engine 45 and Cognition Engine 50, respectively. The Embodiment component 72 comprises the physical component of the agent and its connection to the virtual world. It comprises a Sensor sub-component 76 and an Actuator sub-component 78. The Sensor sub-component 76 includes sensors that can gather information from the virtual world. For example, a visual sensor extracts the scene graph of objects located in the graphical world for further processing. As a further example, speech recognition software (e.g., Sphinx™ or Dragon™) embedded in the speech sensing module translates a speech utterance into a text form suitable for further processing by the agent. Other sensors can include, for example, text, gesture and sketch sensors. The Actuator sub-component 78 delivers executable action to the virtual world. For example, a piece of text can be transformed into a speech signal by an interpreter and sent to a speaker, or an action script can be transformed into an agent animation. Actuator functions can include, for example, imagination, manipulator, locomotion and agent sensor actuation. For example, the locomotion capability of a virtual agent can be provided by two wheels powered by independently driven motors or actuators. Power of force can be applied to these wheels via the motors using physical simulation provided by a physics engine. In one embodiment of the present invention, a physics engine such as the open source engine, Bullet™, is employed.

The Cognition component 74 provides the various cognitive abilities for the agent and interfaces with the Embodiment component 72. In one embodiment of the present invention, the Cognition component 74 comprises the Sensor Interpreters sub-component 80, the Action Interpreters sub-component 82, the Working Memory sub-component 84 and the Executive sub-component 86. The Sensor Interpreters sub-component 80 comprises interpreter elements that are adapted to transform raw sensory inputs such as text, scene graphics, and gesture signals into a logical form or "mentalese." Logical forms are specialized computational representations that can be processed by reasoners or inference engines (e.g., first order logic). Given the diversity of logic languages such as first order, second order or higher order logics, the present invention can employ, in one embodiment, its own internal representation language called CRL (which stands for CoASTeR Representation Language). CRL is the present invention's canonical method for exchanging data across the agent sub-components. In one embodiment of the present invention, the syntax and the conventions of CRL are based on the ontologies and knowledge base associated with CycL developed by Cycorp, Inc. of Austin, Tex., in order to support its wide compatibility and acceptability among users. The present invention can include the following language components, for example: predicates, entities, logical connectives, types, modal operators, and other higher-order relations, as shown in the exemplary screen display 105 of FIG. 3.

The Working Memory sub-component 84 is adapted to include a version of the Belief Desires and Intentions software model (BDI model) as part of the working memory. Beliefs 90 contain facts about the world as perceived by agents of the present invention. The Goals 92 are high level objectives that the agent must accomplish and the Intentions 94 are planned commitments to achieve the Goals.

The Executive sub-component 86 orchestrates the functioning of all of the other components in the agent's cognition. For example, the Executive sub-component 86 sets the goals and activates the reasoners to plan, schedule, and prioritize actions. The Executive sub-component 86 includes a meta-cognition component 95 that can receive information from the Beliefs element 90 and exchange information with the Goals element 92. A principal task of the meta-cognition component 95 is to, based on the sensed situation, set and prioritize goals to perform. For example, when a command to locate an object is received from the text input, the meta-cognition component's goal setting algorithm can post a locative response task in the agent's belief base. The reasoners 96 include a set of swappable components that can take CRL representations of the virtual world and decide and develop an action response for the agent, for example. Reasoners can include, for example, path planners that help the agent decide how to move from one location to another or a locative response and/or landmark selection component that helps the agent decide how to answer a locative question pertaining to an object in the world. In one embodiment of the present invention, the reasoners output their decisions in CRL mentalese, which is then handed off to the Action Interpreters component 82 via Intentions element 94 for further processing. The Action Interpreters component 82 is adapted to transform the CRL mentalese into executable information. For example, a language interpreter can transform a logical form representation of what an agent needs to say into a text form. Alternatively, a scene interpreter can transform a placement decision into a scene graph.

The Long term memory 100 of an agent comprises a variety of knowledge resources needed by the interpreters and generators. Such knowledge can include, for example, the lexicon for interpreting natural language or knowledge about objects in the world.

Exemplary Locative Question Answering

Consider an end user interacting with the system 10 of the present invention using client 15. The end user is accessing a virtual world via the World Engine 45 of engine 40. The end user's goal in this example is to identify the set of landmarks within the virtual world, W, and the corresponding spatial relations that minimize the response processing cost and maximize the chances of success for the querying agent in locating the object. The world, W, contains a set of objects, O, located in various places within W, and further contains a querying agent, $q\alpha$, wherein the querying agent can issue a locative query lq requesting a responding agent $r\alpha$ to locate the target object, $o^t$ in W, and identify the set of landmarks as desired. The set of landmark objects, $O^j$, is a subset of the total set of objects, O.

The present invention, in one embodiment, represents the following attributes for objects including agents in the world:

1. Volume: The physical volume of the object given by the bounding box of the object. A "bounding box" can be, for example, a three-dimensional fictional box that is just large enough to hold the target object, and for which a volume calculation can readily be made. For example, a cylindrical water bottle may have a cylindrical bounding box and a book may have a substantially rectangular prism bounding box for purposes of calculating their respective volumes according to the present invention. As explained later, one embodiment of the present invention can assume that landmark objects (e.g., objects on which something is placed, such as a table) typically have larger volumes than the target objects (e.g., a book) and that the search difficulty is a function of the relative sizes. In one embodiment of the present invention, the volume can be used as a proxy for the search area that must be scanned.

2. Color and luminosity: One embodiment of the present invention represents the average color of an object by its RGB (red green blue) value. The present invention can use this to compute the ease with which a target object can be spotted against a given background. Intuitively, an object that blends with a given background is harder to spot and raises the visual search cost and vice versa. Similarly, bright objects against dull backgrounds are more attention grabbing than dull objects.

3. Familiarity: This represents the probability that a querying agent is familiar with the type of target objects and can recognize one when it is within its field of view. The present invention can represent familiarity, in one embodiment of the present invention, using a qualitative probability scale as follows:

have seen it a lot before or very familiar (e.g., familiarity factor value of 1.0)

have seen it a few times before or familiar (e.g., familiarity factor value of 0.75)

have seen it once or somewhat familiar (e.g., familiarity factor value of 0.5)

have not seen it but know of similar objects or marginally familiar (e.g., familiarity factor value of 0.3)

have never seen it or unfamiliar (e.g., familiarity factor value of 0.2).

Inter Object Relations Representation. Given a set of objects in the W, for each pair of objects, (e.g., landmark and target), the present invention can represent the following items:

1. Visibility: If the target object is visible from a landmark or a chosen vantage point, then the visual scanning effort remains unaffected. However, if the target object is occluded or hidden, then the search cost is infinite.

2. Distance: The shortest distance between the bounding boxes of the two objects measured in the same units as the volume. The present invention may assume, in one embodiment, that the distance between the two objects has an influence on the search cost. For example, the larger the distance, the larger the search cost.

3. Spatial relation: The type of spatial relation between the two objects. These include all the spatial relations expressed in a language. For example, for English, the present invention can include "leftOf", "rightOf", "infrontOf", "behind", "above", "below", "under", "over", "on", and "in." The present invention can further attribute a different cost to each of the spatial relations denoting their contribution to search difficulty. For example, "on" is the easiest relation to process with a cost of 1 and "behind" is the most difficult relation to process and assigned a cost of 5. It will be appreciated that these costs can be altered to suit the agent performance or learned by a parameter estimation technique.

4. Target Background Color: The background color and luminosity in comparison to the target object from the landmark vantage point is a key factor contributing to the search cost. If the target object color is very different from the background, the search cost is likely to be low and vice versa.

One example of a least cost landmark selection and response generation algorithm in accordance with the present invention is described below.

In this example, the inputs can be (1) the set of objects, O, in the world, W; (2) the target object to be located, $o^t$ (e.g., Printer); the knowledge base, KB, containing the properties of objects in the world covering all the objects (O and $o^t$); the relation difficulty factor (RDF) values; the familiarity factor (F) values, the description length penalty parameter (P), and the maximum number of landmarks admissible in a response, $L^{max}$. The $L^{max}$ number can be predetermined, in accordance with one embodiment of the present invention. The output is u, the least cost response utterance for the querying agent, qα.

The process according to one embodiment of the present invention can occur as follows:

1. Select the candidate landmarks ($CO^l$): the candidate landmarks are those objects that lie on the potential paths between qα and $o^t$. A naïve approach would be to select all of the objects that lie between qα and $o^t$. Further, the present invention may only select those objects that are larger than $o^t$, since as discussed above, most target objects are smaller than the respective landmark objects. In one embodiment, the present invention assumes that the requesting agent, rα, has complete and perfect knowledge of all of the objects in the world including the location of qα, which is not unreasonable in a virtual world. In a physical world, such as ships and retail stores, for example, where the electronic graphical models and simulations are available, this assumption also holds to a large extent. It will be appreciated that the agent's performance may be suboptimal to the degree that the perfect knowledge assumption is violated.

2. Create the set of objects $O^s$ for computing the inter-object relations, which is the union of $CO^l$, qα, and $o^t$, as represented by $O^s = CO^l \cup \{q\alpha, o^t\}$.

3. Compute the inter-object relations R for all of the object pairs $o^i$ and $o^j$, where i does not equal j and where $o^i$ and $o^j$ are elements of the set of objects as represented by $o^i$ and $o^j \in O^s$ i≠j. For each pair of objects and the relation $r^{i,j}$, the present invention can compute the visibility, distance, spatial relation, and background of $o^j$ from $o^i$.

4. Construct the cost computation tree T. The tree comprises a set of nodes (N), each of which may have only one parent and zero or more children. If the node does not have a parent, then it is the root of the tree and if it does not have any children, then it is a leaf. The requesting agent rα is always the root of the tree. In one embodiment, the present invention grows the tree starting from this root as follows. First, the children are inserted into a node by selecting all those objects from $CO^l$ that are smaller in volume than the object represented by the tree node. However, this rule is not applied to the root node. These steps can be repeated until the tree depth reaches $L^{max}$, after which $o^t$ is inserted as the only child of all the existing leaf nodes. Each path in the tree starting from the root to a leaf represents the potential set of landmarks that can be used to generate a response utterance u.

5. Compute the node costs considering the querying agent, $nc^k$ for all the nodes in the T: These costs for a node $n^k$ in the tree comprise the following elements:

a. Visual Area Scan Cost (vasc): In one embodiment, the present invention assumes that the effort to visually scan the target increases in proportion to the relative sizes of the objects. Therefore, the present invention can compute as follows: $vasc(o^i, o^j) = volumeOf(o^i)/volumeOf(o^j)$. This implies that when using a very large object as a reference for a tiny object it leads to a very high vasc. Furthermore, if $o^j$ is not visible from $o^i$, then vasc=∞.

b. Distance Scan Factor (dsf): The present invention assumes, in one embodiment, that the distance from the reference to the target object contributes to the visual area scan cost. The larger the distance, the larger the potential scan cost. The present invention can compute $dsf(o^i, o^j) = distance(o^i, o^j)/\sqrt[3]{volumeOf(o^j)}$.

c. Relational Scan Difficulty Factor (rsdf): The present invention can assume that the type of relation contributes to the visual scan difficulty. For the given type of relation for a pair of objects, the present invention retrieves the value; $rsdf(o^i, o^j) = RDF.getValue(r(o^i, o^j))$.

d. Target Recognition Difficulty Cost (trdc): The present invention can assume that the ability to recognize a target object of is inversely proportional to the qα's familiarity with the object. i.e., $trdc(o^j) = 1/F.getValue(f(d))$.

e. Target Background Contrast Cost (tbcc): The more the target color is different from the background, the easier it is to spot during a visual scan and vice versa. Therefore, the present invention can compute $tbcc(o^j) = 1/backgroundContrast$, where background contrast value ranges between 0 and 1, [0,1]; 1 is the highest possible contrast and 0 is no contrast at all.

f. Description Length Penalty Factor (dlpf): The present invention assumes that a shorter response description, that is, one with fewer landmarks, is easier and cognitively less expensive for qα to process and vice versa. Therefore, for a node at a tree depth of d (d≤$L^{max}$), the present invention computes dlpf=func(P,d), where the function can be $P^d$, for example.

g. Parent node cost (pc): The cost of the parent.

The present invention computes the total node costs by including and excluding the querying agent $nc^k$ as follows:

$$nc^k = pc + vasedsf*rsdf*trdetbcc*dlpf$$

As can be seen above, the computation of node costs starts at the root. The node cost of the root qα=0. Intuitively, the querying agent knows itself and incurs no scanning cost to locate itself. The present invention can propagate the cost computation from the root to the leaves.

6. Select the minimum cost leaf node($n^{min}$): The present invention obtains all of the leaf nodes from T and sequentially scans for the ones with the least node cost $nc^{min}$.

7. Decide whether to include qα as landmark: In one embodiment of the present invention, if the first landmark is not within the visual field of qα, then qα is to be included as a landmark.

8. Generate the minimum cost description u: The series of landmarks from root qα to the leaf are used to generate a description.

In operation, the present invention can be used in a variety of environments. For example, if a given set, O, of objects in a virtual world, W, includes a home office, a table, a drawer, a red book, a water bottle, a chair, a pen, a bookshelf, a wall and a querying agent.

Consider a world W comprising the following objects O, as illustrated in FIG. 3: A home office 150, which has a table 152 with a drawer 154, a red book 158 and a water bottle 160 on the table 152, and the drawer has a pen in it 156. In addition, the room has a chair 162 in front of the table and a bookshelf 164 against the wall 166 of the office 150 as shown in the diagram below. The querying agent qα is located in front of the table shown by $p^1$ in FIG. 3. The agent asks the helper autonomous agent "Where is the red book?"

The inputs are as follows:

1. O={office, table, drawer, red book, water bottle, chair, pen, bookshelf, wall, qα}
2. $o^t$=red book
3. Knowledge Base, KB, shown in Table 1 below.

TABLE 1

Knowledge Base specifying properties covering the objects in the World

| Object | Volume (cu in) | Color | Familiarity |
|---|---|---|---|
| Office | 3110400 | 1 | 1 |
| Wall | 138240 | 1 | 1 |
| Table | 124416 | 2 | 1 |
| Bookshelf | 51840 | 4 | 1 |
| Chair | 10800 | 2 | 1 |
| qα | 9792 | 3 | 1 |
| Drawer | 2700 | 2 | 1 |
| Water Bottle | 192 | 5 | 1 |
| Red Book | 96 | 6 | 1 |
| Pen | 2 | 7 | 1 |

4. Relation Difficulty Factor (RDF) shown in Table 2.

TABLE 2

Relevant RDF values for various spatial relations

| Relation | RDF Value |
|---|---|
| on | 1 |
| in | 2 |
| above | 2 |
| next | 4 |
| under | 5 |
| front | 3 |

5. Familiarity factor (F) values (see Table 1).
6. Description length penalty parameter (P)=1.2
7. $L^{max}$=3;

The landmark selection algorithm in accordance with one embodiment of the present invention can proceed as follows. The present invention selects the candidate landmarks that lie between qα and the "Red Book" $CO^1$={Table, Chair, Drawer, Water Bottle}. Next, the present invention creates the set of objects to compute the inter-object relations $O^s$={Table, Chair, Drawer, Water Bottle, qα, RedBook}. The responding agent rα queries the world to compute the inter-object relations as shown in Table 3.

TABLE 3

Example relevant inter-object relations for objects in $O^s$

| Landmark | Target | Visible | Distance | Spatial Relation | Contrast |
|---|---|---|---|---|---|
| qα | Table | True | 120 | in front of | 0.6 |
| qα | Drawer | True | 120 | in_front_of | 0.2 |
| qα | Chair | True | 100 | in front of | 0.8 |
| qα | Water Bottle | True | 140 | in_front_of | 0.3 |
| qα | Redbook | True | 135 | in front of | 0.9 |
| Table | Drawer | True | 2 | under | 0.2 |
| Table | Water Bottle | True | 0 | on | 0.3 |
| Table | Chair | True | 15 | In front of | 0.8 |
| Table | Redbook | True | 0 | on | 0.9 |
| Chair | Drawer | True | 10 | In front of | 0.8 |
| Chair | Bottle | True | 25 | In front of | 0.3 |
| Chair | Redbook | True | 20 | In front of | 0.9 |
| Drawer | Water Bottle | False | 30 | above | 0.3 |
| Drawer | Redbook | False | 25 | Above | 0.9 |
| Water Bottle | Redbook | True | 5 | next to | 0.9 |

The present invention then constructs the cost computation tree and computes the node cost for all the nodes in T, as shown in the exemplary diagram of cost tree computations 170 in FIG. 4. In one embodiment, the present invention can select the minimum cost leaf node from the tree which is "book" with "Table" as the parent with a nc=2257.57 shown in bold. On this basis, the present invention can generate the response to the question as follows: "the book is on the table."

Similarly, when qα is facing the wall (i.e., located at $p^2$ in FIG. 3), the leaf node with the least cost nc=2380.21 and the resulting utterance is "the book is behind you on the table." In this embodiment, the qα is included as landmark in the response because the first landmark, i.e., the Table, is not within the qα's field of view. When qα is located outside the room (i.e., at $p^3$ in FIG. 3) the response is "the book is on the table in the Office." (nc=8325.97).

Parameter Learning

In the examples above, the present invention manually sets the input parameters such as those for RDF, P, F and $L^{max}$. However, these parameters can be automatically learned from user response data using one of many available machine learning techniques, such as genetic algorithms, for example. As another example, one can collect a reasonably large database of situations and responses from human users using crowd sourcing techniques such as Amazon Mechanical Turk™. The acquired database can be used to perform parameter learning so as to minimize the system response error. The learned parameter values can then be use straightforwardly according to the present invention.

Answering Locative Questions with CoASTeR

As another example, consider a multiplayer combat training simulator, where a trainee interacts with a virtual teammate in a training application which is integrated into the system of the present invention. It will be appreciated that the combat training application can be substituted by an indoor navigation assistance system without any loss of equivalent functionality. Depending on the application, the trainee may or may not have access to a display such as a computer or a handheld device such as a smart phone. Further, consider two possible scenarios of interaction. The first scenario involves only one modality of input. In this scenario, the user speaks to a microphone or a smart phone "Where is the ammunition depot?" The second scenario involves two modalities of input; speech and gesture. In this scenario, the user speaks a slightly different question into the microphone "Where is that ammunition depot?" and points to the depot using a Wii™ remote or finger (e.g., when the system is connected with a gesture recognition system such as Microsoft Kinect™). A virtual agent in accordance with the present invention can transform this input into an answer. For example, the Reasoners component 96 of FIG. 2 can include a landmark selection reasoner that can process and respond to a variety of commands. English can be assumed to be the language used for commands. However, other natural languages could be used as well with suitable changes to speech recognition and language understanding lexicons. The command structure can include a combination of the following elements:

Locative query marker: This refers to the command term "where" in the query.

Linking verb: This refers to the term "is" in its various forms such as "are" for plural and potentially past tense forms such as "was" and "were".

Target object to be located: This can include common terms referring to objects, such as person, ammunition depot, and building available to the user in the application of interest. When used in combination with gesture, the object may be referred by pronouns such as this, that, it. In linguistics, this is called a diectic reference. The vocabulary of the agent covers the range of objects to be supported by the agent. The present invention can support a range of qualifiers that can further specify a target object or the set of objects. These include adjectives such as color, weigh, size, texture, etc. Examples of locative queries with the above three command structure elements are: (1) "Where are my glasses?" This query is about a household object location with a possessive pronoun "my" to specify a particular pair of glasses. (2) "Where is Johnny'?" This query is about a person's location. (3) "Where is the dinosaur exhibit?" This is a query about an urban location in a museum. (4) "Where is the red couch?" This is a query using the adjective "red" to specify and select a particular couch among others. (5) "Where is that building?" This is a query demonstrating the use of pronoun "that" in combination with a pointing gesture. (6) "Where is that?" This is a query using a pronoun with diexis (i.e., missing object) and a pointing gesture.

Dialog

In the course of interpreting the user commands, virtual agents in accordance with the present invention may encounter ambiguity or interpretation failure. For example, when multiple targets are present in the scene or World, the agent may not be able to correctly identify the target object to which the user is referring. Alternatively, interpretation failure may occur if the object being referred is not available in the agent's memory. For example, in the command "Where is the Autonomous Systems Laboratory?" the agent may not know about the item Autonomous Systems Laboratory. To resolve such ambiguities and interpretation failures, the agent can engage in a dialog with the end user in accordance with one embodiment of the present invention. For example, the agent can query the user using questions such as "Which laboratory do you mean—the robots lab or the nano-technology lab?" The user responses can be used to resolve ambiguities.

Once any ambiguities or interpretation failure is resolved, the present invention can operate to respond to the locative query using a portion or all of the methods described above in connection with the previous example.

In accordance with the above, it will be appreciated that the present invention provides, in part, a software architecture for communicative agents for spatio-temporal reasoning. The present invention can be integrated with a myriad of practical applications to enable their multimodal interaction abilities and vastly improve the end user experience. It will further be appreciated that a program or programs may be provided having instructions adapted to cause a processing unit or a network of data processing units to realize elements of the above embodiments and to carry out the method of at least one of the above operations. Furthermore, a computer readable medium may be provided, in which a program is embodied, where the program is to make a computer execute the method of the above operation. Also, a computer-readable medium may be provided having a program embodied thereon, where the program is to make a system or device to execute functions or operations of the features and elements of the above described examples. A non-transitory computer-readable medium can be a magnetic or optical or other tangible medium on which a program is recorded. Additionally, a computer program product may be provided including the computer-readable medium.

The invention claimed is:

1. A system for locating a virtually displayed object in a virtual environment, comprising:
   at least one input device adapted to receive at least one of speech, gesture, text and touchscreen inputs; and
   a computer processor adapted to execute a program stored in a computer memory, the program being operable to provide instructions to the computer processor including:
   receiving user input via the at least one input device, wherein the user input comprises a query regarding a location of at least one target object in the virtual environment;
   interfacing with the virtual environment using a virtual agent;
   sensing, by the virtual agent, a plurality of candidate landmark objects and the at least one target object in the virtual environment; and deriving an optimum natural language response describing the location of the at least one target object in response to the query by deriving a cost computation for each of the plurality of candidate landmark objects and determining a minimum response processing cost based on at least one of: the respective locations of the at least one target object and at least one of the candidate landmark objects, the respective sizes of the at least one target object and at least one of the candidate landmark objects, the visibility of the at least one target object to the agent from at least one of the candidate landmark objects and a spatial relationship between the at least one target object and at least one of the candidate landmark objects.

2. The system of claim 1 wherein deriving an optimum natural language response includes selecting at least one of the candidate landmark objects based upon the at least one candidate landmark object being on a potential path between the virtual agent and the target object.

3. The system of claim 1 wherein deriving an optimum natural language response includes selecting at least one of the candidate landmark objects based upon the at least one candidate landmark object being larger in size than the target object.

4. The system of claim 1 wherein deriving a cost computation for each of the plurality of candidate landmark objects includes constructing a cost tree with a plurality of nodes, with each of the plurality of nodes representing a candidate landmark object, wherein the nodes are arranged into at least one path, and wherein the at least one path is ordered by descending volume of the nodes.

5. A computer-implemented method, comprising:
  receiving, by a computer engine, user input that comprises a query regarding at least one target object in a virtual environment;
  interfacing, via the computer engine, with the virtual environment;
  sensing, via a virtual agent associated with the computer engine, a plurality of candidate landmark objects and the at least one target object in the virtual environment; and
  deriving an optimum natural language response describing the location of the at least one target object in response to the query by deriving a set of object pairs in the virtual environment and computing at least one inter-object relation associated with each object pair, deriving a cost computation for each of the plurality of candidate landmark objects, wherein deriving a cost computation for each candidate landmark object includes constructing a cost tree with a plurality of nodes, with each of the plurality of nodes representing a candidate landmark object, and deriving a cost associated with each node, wherein the cost associated with each node is determined by determining a visual area scan cost, a relational scan difficulty factor, a target recognition difficulty cost, a target background contrast cost, a description length penalty factor and a parent node cost, and by determining a minimum response processing cost based on at least one of: the respective locations of the at least one target object and at least one of the candidate landmark objects, the respective sizes of the at least one target object and at least one of the candidate landmark objects, the visibility of the at least one target object to the agent from at least one of the candidate landmark objects and a spatial relationship between the at least one target object and at least one of the candidate landmark objects.

6. The method of claim 5 wherein the cost associated with each node is calculated through the sum of the visual area scan cost, the relational scan difficulty factor, the target recognition difficulty cost, the target background contrast cost, the description length penalty factor and the parent node cost.

7. The method of claim 5 wherein the nodes are arranged in one or more paths as part of the cost tree, and wherein the path associated with the lowest cost is used to generate the optimum utterance.

* * * * *